(No Model.) 2 Sheets—Sheet 1.
B. LYON.
COMPUTING SCALE OR BALANCE.
No. 600,837. Patented Mar. 15, 1898.
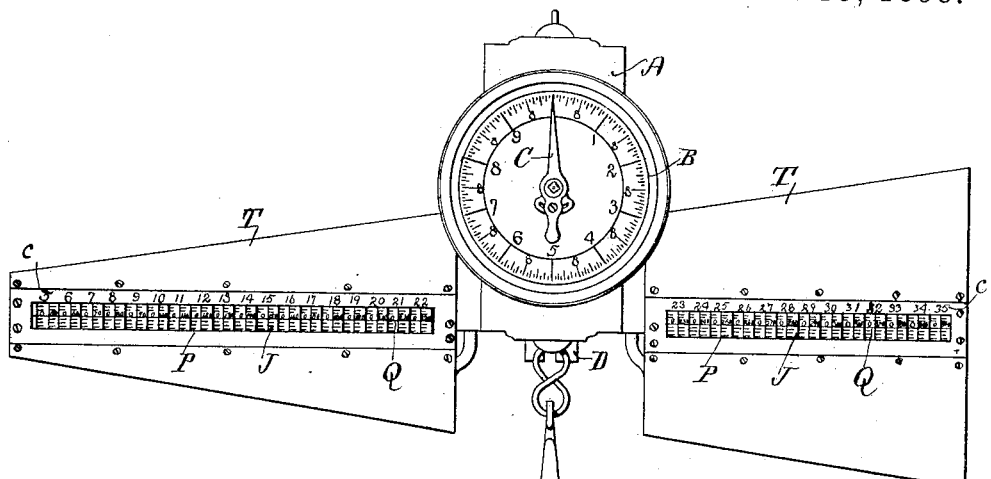
FIG. 1.
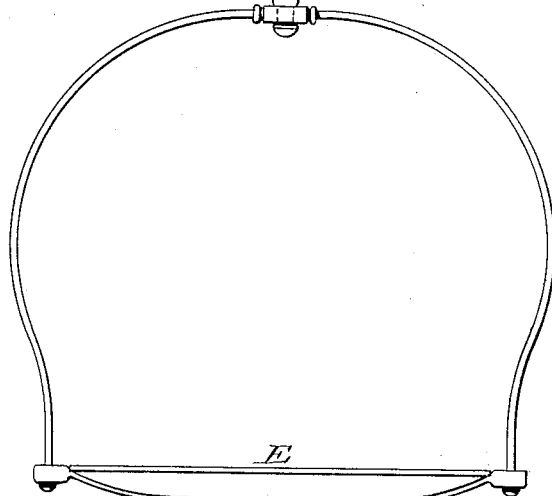
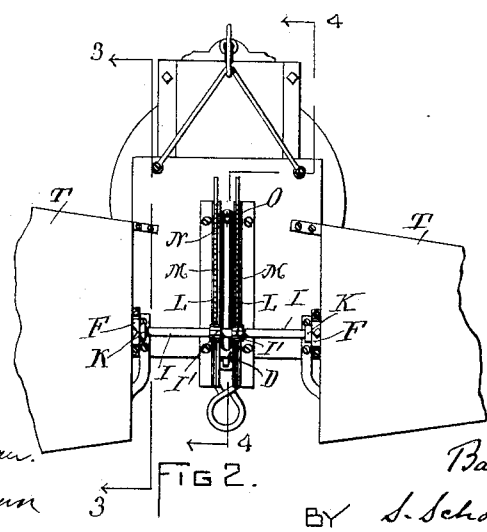
FIG. 2.
WITNESSES:
Harry J. Garceau.
James M. Leman
INVENTOR:
Baxter Lyon
BY S. Scholfield
ATTY.

(No Model.) 2 Sheets—Sheet 2.

B. LYON.
COMPUTING SCALE OR BALANCE.

No. 600,837. Patented Mar. 15, 1898.

WITNESSES:
Harry J. Garceau
James W. Brennan

INVENTOR:
Baxter Lyon
S. Scholfield
BY ATTY.

UNITED STATES PATENT OFFICE.

BAXTER LYON, OF PROVIDENCE, RHODE ISLAND, ASSIGNOR TO HIMSELF AND CHARLES R. BROMLEY, OF SAME PLACE.

COMPUTING SCALE OR BALANCE.

SPECIFICATION forming part of Letters Patent No. 600,837, dated March 15, 1898.

Application filed April 13, 1897. Serial No. 632,001. (No model.)

*To all whom it may concern:*

Be it known that I, BAXTER LYON, a citizen of the United States, residing at Providence, in the State of Rhode Island, have invented a new and useful Improvement in Computing Scales or Balances, of which the following is a specification.

The object of my invention is to provide a convenient computing scale or balance of simple construction adapted for ascertaining upon ready inspection the full price of the articles of merchandise weighed upon the scale; and it consists in the employment of a conical drum arranged in cylindrical steps, having graduations and numbers marked upon the cylindrical peripheries of the drum to indicate the full price of the article weighed, in connection with a series of figures representing the price per pound, and in the sliding universal joint between the indicating means and the weighing means.

Figure 4:
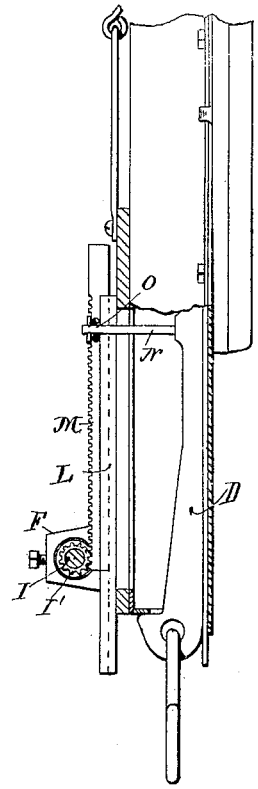
Figure 10:
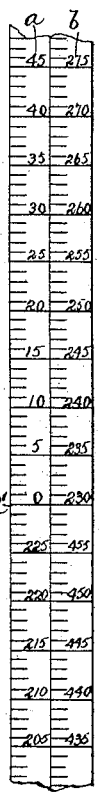
Figure 7:
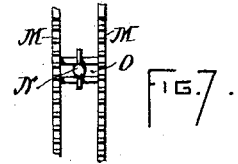
Figure 6:
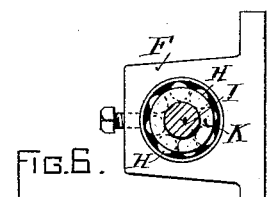
Figure 8:
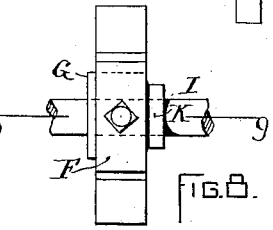
Figure 9:
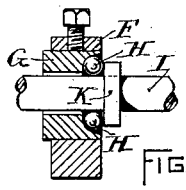
Figure 5:
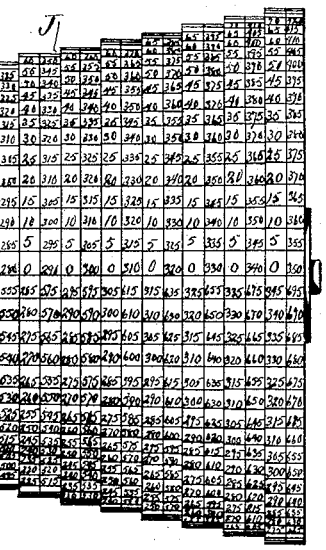

In the accompanying drawings, Figure 1 represents a front view of a spring-balance provided with a computing-drum embodying my improvement. Fig. 2 represents a detail rear view. Fig. 3 represents a section taken in the line 3 3 of Fig. 2. Fig. 4 represents a detail section taken in the line 4 4 of Fig. 2. Fig. 5 represents an enlarged side view of the graduated drum upon which the figures which indicate the full price of the article to be weighed are marked. Figs. 6, 8, and 9 are detail views showing the ball-bearing for the shaft of the drum. Fig. 7 is a detail view showing the universal sliding-joint connection of the weighing mechanism with the sliding racks which serve to cause the rotation of the drum. Fig. 10 is an enlarged representation of the graduation and numeration of the computing-drum.

In the drawings, A represents the outer case of a spring-balance; B, the dial; C, the indicating-pointer, and D the pendent bar to which the weighing-pan E is attached. To the back of the outer case A are secured the ball-bearing brackets F F, which contain the bearing-sleeve G and the balls H H, the shaft I of the drums J J being provided with the collars K K, which revolve in contact with the balls H H and with the gears I', which engage with the racks M M. To the back of the case A are also secured the ways L L, which serve to guide the parallel racks M M, which are connected with the pendent bar D of the spring-balance by means of a universal sliding joint formed by the projecting stud N and the slot O, arranged between the said racks M M. The pendent bar D will thus be connected with the racks in such a manner that the loose vibrating movement of the pendent bar D will not affect the movement of the said racks. The drums J J are provided with an outer case or covering T, made in conical form and provided upon the front side with on elongated opening closed by a glass strip P, having the datum-line Q marked thereon. The drums J J are formed in cylindrical steps, having an ascending series of figures in two circumferential rows $a$ and $b$ marked thereon from the datum-line Q', which corresponds with the zero-point of the spring-balance, the said series of figures serving to represent the full price of the article which is being weighed.

Upon the conical outer cases of the drums J J are marked from the left to the right the ascending series of numbers "5," "6," "7," &c., which numbers represent the price per pound of the weighed article, the figures upon the drum at the datum-line Q under the said numbers serving to indicate the full price for the whole number of pounds weight at the represented rate per pound, the first turn of the pointer C of the spring-balance being represented by the left-hand circumferential row of figures $a$ upon the drum and the second turn of the said pointer by the adjoining right-hand row of figures $b$, so that in all cases the full price for the number of pounds indicated by the spring-balance will be shown at the datum-line Q under the number in the series of figures $c$, which represents the price per pound, and upon inspection of the vertical position of the pendent bar D it can be readily seen how many times the hand or pointer C has passed around the dial.

The advantage of the arrangement of the surface of the drum in cylindrical steps consists in the greater facility for applying the graduations and in the distinctive separation of each of the graduated cylindrical surfaces by the annular rise between the said surfaces which serves to prevent error in reading the graduations, and the drum may be readily formed of cylindrical disks arranged side by side.

I claim as my invention—

1. The combination of the weighing-balance, with a rotary computing-drum operatively connected with the balance, and having its surface arranged in cylindrical steps, which are graduated and notated to indicate the full price of the article weighed upon the balance, the fixed series of numbers representing the price per pound, and the fixed datum-line which corresponds with the zero-point of the balance, the annular rise between the cylindrical surfaces of the steps serving to distinctly separate the several scales of prices from each other upon the surface of the drum, substantially as described.

2. The combination of a weighing-balance, with a rotary computing-drum operatively connected with the balance, and having its surface arranged in cylindrical steps which are graduated and notated to indicate the full price of the article weighed upon the balance, the annular rise between the cylindrical surfaces of the steps serving to distinctly separate the scales of prices from each other on the surface of the drum, substantially as described.

3. In a computing-scale, the combination of the outer case, the dial, the indicating hand or pointer, and the pendent bar of a spring-balance, with the graduated and notated drums and drum-shaft, the racks and gears for operating the drums, and the stud-and-slot connection between the pendent bar and the racks, substantially as described.

BAXTER LYON.

Witnesses:
SOCRATES SCHOLFIELD,
JAMES W. BEUMAN.